United States Patent [19]

Rastas et al.

[11] Patent Number: 4,474,735

[45] Date of Patent: Oct. 2, 1984

[54] PROCESS FOR THE RECOVERY OF VALUABLE METALS FROM SPENT CRUDE-OIL SULFUR-EXTRACTION CATALYSTS

[75] Inventors: Jussi K. Rastas, Pori; Kauko J. Karpale; Heikki Tiitinen, both of Ulvila, all of Finland

[73] Assignee: Outokumpu Oy, Outokumpu, Finland

[21] Appl. No.: 425,663

[22] Filed: Sep. 28, 1982

[30] Foreign Application Priority Data

Oct. 13, 1981 [FI] Finland ................................ 813173

[51] Int. Cl.$^3$ ...................... C01G 39/00; C01G 51/00; C01G 53/00; C01F 7/76
[52] U.S. Cl. ........................................ 423/53; 423/68; 423/114; 423/115; 423/117; 423/122; 423/128; 423/150
[58] Field of Search ................ 423/117, 122, 128, 53, 423/68, 114, 115, 150

[56] References Cited

U.S. PATENT DOCUMENTS

| | | | |
|---|---|---|---|
| 3,567,433 | 3/1971 | Gutnikov | 423/53 |
| 3,578,395 | 5/1971 | Kliksdahl et al. | 423/49 |
| 4,087,510 | 5/1978 | Steenken | 423/53 |
| 4,100,251 | 7/1978 | Reinhardt et al. | 423/68 |
| 4,115,110 | 9/1978 | Pyrih et al. | 423/68 |
| 4,145,397 | 3/1979 | Toida et al. | 423/68 |
| 4,343,774 | 8/1982 | Tilley | 423/53 |
| 4,394,368 | 7/1983 | Shanks | 423/128 |

Primary Examiner—Herbert T. Carter
Attorney, Agent, or Firm—Webb, Burden, Robinson & Webb

[57] ABSTRACT

A process for the recovery of valuable metals from roasted crude-oil sulfur-extraction catalyst waste is disclosed. In this process the value metals can be separated from aluminum in a single stage by treating the waste at elevated temperature and pressure with such an amount of sulfate solution that the waste dissolves and the aluminum simultaneously precipitates as alunite, which is separated from the solution which contains the other value metals. A sulfate solution is preferably added in such an amount that the concentration of sulfuric acid in the solution is 2-30 g/l at the end of the stage.

8 Claims, No Drawings

PROCESS FOR THE RECOVERY OF VALUABLE METALS FROM SPENT CRUDE-OIL SULFUR-EXTRACTION CATALYSTS

BACKGROUND OF THE INVENTION

The present invention relates to a process for the recovery of value metals, and in particular cobalt, nickel, molybdenum, vanadium and aluminum, from spent and roasted crude-oil sulfur-extraction catalyst wastes by leaching finely-divided burnt leavings at an elevated temperature and by separating valuable substances from the solution.

A considerable amount of sulfur dioxide passes into the environment when sulfur-containing oil products are used. In order to diminish the sulfur emission it is necessary in oil refineries to remove most of the sulfur in crude-oil in connection with the refining of crude-oil. For the extraction of sulfur, hydrogen is directed at a suitable pressure and temperature through crude-oil in the presence of catalysts. The sulfur present in the oil reacts with the hydrogen, thereby forming gaseous hydrogen sulfide, which is directed out of the reaction system and recovered. The catalysts used are mainly aluminum oxide based materials in which the active constituents are cobalt and molybdenum or nickel and molybdenum. During the extraction of sulfur, some of the vanadium and nickel present in the oil passes into the catalysts, which become enriched with these metals, the catalysts gradually losing their catalytic activity.

In addition to the aluminum oxide base the spent catalysts thus contain cobalt, nickel, molybdenum and vanadium. All these constituents are valuable, and it is advisable to aim at recovering all of them during the reprocessing of the spent catalysts.

It is an established practice to subject the catalyst wastes to an oxidizing roasting at below 600° C. in order to remove the volatiles concentrated in them, hydrocarbons, carbons, and some of the sulfur and compounds of sulfur. Especially in connection with plants in which sulfidic concentrates are roasted or smelted, such a pre-treatment of spent catalysts by roasting is simple to carry out, since the flue gases can easily be directed into $SO_2$-bearing roaster or smelting-plant gases.

The burnt leavings are usually crushed and ground before further processing.

The German Pat. No. 23 16 837 discloses a multiple-stage process for the recovery of the valuable elements present in catalyst waste. Calcined catalyst waste is roasted in the presence of sodium chloride, whereafter the molybdenum and vanadium are leached in water and separated. The cobalt, nickel and aluminum remaining in the precipitate are trated during the subsequent stage by means of a sodium hydroxide solution, whereby aluminum is obtained in the solution and is precipitated out from it as aluminum hydroxide after separation. The cobalt and nickel are recovered from the filtration precipitate by known methods. The process is a multiple-stage process and, owing to a high consumption of reagent, expensive. Also, it is necessary to treat aluminum oxide, the main constituent of the catalyst waste, in several process stages before it is obtained in solution form and further recovered. The treatment of large amounts of precipitates, of course, complicates the various process stages and increases the cost.

In the process according to U.S. Pat No. 4,087,510 one process stage has been eliminated as compared with the above, by calcining the catalyst waste directly with sodium carbonate without the normal oxidizing roasting, whereby the vanadium and molybdenum are brought to a water-soluble form and can be separated as above.

The aluminum, cobalt and nickel remaining in the precipitate can be recovered by known methods, for example as instructed in the German Pat. No. 23 16 837.

In addition, several processes are known in which only one or some of the valuable elements of the catalyst waste are recovered, the aluminum oxide or aluminum hydroxide which constitutes the base of the catalyst waste remaining in the waste. When aluminum-based Co-, Mo-, V- and Ni-containing catalyst wastes are leached for the recovery of Co, Mo, V and Ni, aluminum dissolving and reprecipitation problems come up.

For a high leaching yield of the valuable metals it is, however, necessary also to leach the aluminum which constitutes the base of the catalyst.

The object of the present invention is to provide a process by which it is possible to bring in a single stage the cobalt, nickel, molybdenum and vanadium of the catalyst waste into solution form and simultaneously the aluminum into the solid phase. The metals in the solution are recovered by known methods. The invention leads to a simple and reliable process by which, furthermore, considerable savings are achieved in equipment, as compared with previous processes.

SUMMARY OF THE INVENTION

According to the present invention there is provided a process for the recovery of valuable substances, such as cobalt, nickel, vanadium, molybdenum and/or aluminum, from roasted crude-oil sulfur-extraction catalyst wastes wherein the burnt leavings are treated in a single stage at a temperature above 100° C. with so large an amount of an aqueous solution of sulfuric acid, aluminum sulfate, alkali metal sulfate or ammonium sulfate or a mixture thereof that the valuable metals substantially dissolve and the aluminum is precipitated as alunite, the solution is then separated from the alunite precipitate, and the aluminum is recovered from the alunite precipitate.

DESCRIPTION OF THE PREFERRED EMBODIMENTS

In accordance with the present invention, the catalyst waste—after the carbon-containing and in part also the sulfur-containing constituents have first been burnt off, the flue gases being directed into the $SO_2$-bearing process gases—is contacted with a sulfuric acid bearing aqueous solution at elevated temperature and pressure. When an aqueous solution of sulfuric acid is used, its amount is proportioned in such a way in relation to the amount of catalyst to be treated that it is approximately equivalent as regards the following reactions:

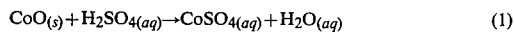  (1)

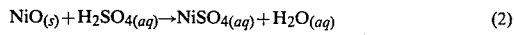  (2)

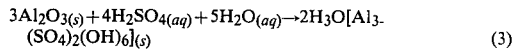  (3)

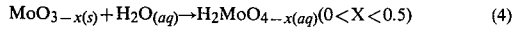  (4)

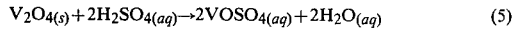  (5)

The sulfuric acid amount added is adjusted so that, after reactions (1)-(5) have taken place, the concentration of sulfuric acid in the solution is between 2 and 30 g/l. The inventional idea of the process is based on the utilization of reaction (3). Reaction (3) can be presented as a sum of sub-reactions (6) and (7):

$$(6) \quad 3Al_2O_{3(s)} + 9H_2SO_{4(aq)} \rightarrow 3Al_2(SO_4)_{3(aq)} + 9H_2O_{(aq)}$$
$$(7) \quad 3Al_2(SO_4)_{3(aq)} + 14H_2O_{(aq)} \rightarrow 2H_3O[Al_3(SO_4)_2(OH)_6]_{(s)} + 5H_2SO_{4(aq)}$$
$$(3) \quad 3Al_2O_{3(s)} + 4H_2SO_{4(aq)} + 5H_2O_{(aq)} \rightarrow 2H_3O[Al_3(SO_4)_2(OH)_6]_{(s)}$$

The $Al_2O_3$ base of the catalyst waste dissolves in accordance with reaction (6), whereby the Co, Ni, Mo and V bound in the $Al_2O_3$ base dissolve almost completely. When the Al content of the solution is sufficiently high and the temperature is within a suitable range, preferably 180°-220° C., reaction (7) occurs. The aluminum precipitates as an easily filtrable $H_3O$-alunite, and the sulfuric acid produced by the reaction is further spent in reactions (1), (2) and (5). The molybdenum passes into solution in water as a highly soluble molybdenum blue, in which the degree of oxidation of the molybdenum is between five and six. Respectively, the vanadium passes into solution at an oxidation degree of four. In reactions (4) and (5) the molybdenum and vanadium are expressed already in the initial compounds of the reaction equations as having the degrees of oxidation which they have in the final solution. The degrees of oxidation of molybdenum and vanadium in the post-roasting solid have not been investigated separately. In the process according to the invention for treating catalyst wastes, however, the molybdenum is present in the solution as so-called molybdenum blue, a compound in which the degree of oxidation of molybdenum is between +5 and +6 (cf. Gmelins Handbuch der Anorganischen Chemie: Molybden, System Nummer 53, pp. 134-142).

Respectively, vanadium has a valence of +4 in the solution.

After reactions (1)-(5) have taken place, the solution is separated from the solid. The solid is washed thoroughly with water. The washing water can be used in the treatment of the next catalyst waste batch, either as a solution phase or as part of it. The cobalt and nickel can be precipitated out from the solution as hydroxides by means of sodium hydroxide, the molybdenum and vanadium remaining in the solution. The hydroxide precipitate is separated from the solution and washed thoroughly. The cobalt and nickel are separated from the solution by some known method and the metals are recovered. It is possible to separate the molybdenum and vanadium out from the solution phase by, for example, extraction, and to precipitate the said metals from the separated solutions in the form of suitable compounds.

The $H_3O$-alunite which has been produced as a result of reaction (3) and been separated from the solution and washed thoroughly can be treated further thermally in, for example, a rotary kiln at above 900° C., preferably at 1150°-1250° C., whereupon the $H_3O$-alunite decomposes according to reaction (8):

$$2H_3O[Al_3(SO_4)_2(OH)_6]_{(s)} \rightarrow 3Al_2O_{3(s)} + 4SO_{2(g)} + 2O_{2(g)} + 9H_2O_{(g)} \quad (8)$$

The aluminum oxide produced as a result of the reaction can be used for various purposes, and the gas produced as a result of the reaction can be directed into the $SO_2$-bearing reaction gases produced in the roasting of sulfidic concentrates.

By the process according to the invention described above, the valuable metals cobalt, nickel, molybdenum and vanadium can be separated in a single stage from aluminum, the principal metal of the catalyst waste.

This process stage of the catalyst waste must, it is true, be carried out in an autoclave, but the only reagent used in addition to water is a relatively inexpensive chemical, e.g. sulfuric acid. Furthermore, in the thermal treatment of the aluminum compound produced, $H_3O$-alunite, the sulfate bound with aluminum is released as sulfur dioxide and can be returned to the sulfuric acid producing unit.

Thus sulfuric acid, the reagent necessary for the separation of aluminum, the principal metal of the catalyst waste, is inexpensive, and it does not go to waste but is recycled.

By this process for leaching catalyst waste is is possible to recover very economically the valuable elements of catalyst waste: aluminum, cobalt, nickel, molybdenum and vanadium.

Instead of an aqueous solution of sulfuric acid, or in addition to it, also some other sulfate, such as aluminum sulfate, alkali metal sulfate and/or ammonium sulfate, can be used for leaching and precipitating the aluminum.

When aluminum sulfate is used, the aluminum is precipitated as hydronium alunite in accordance with reaction (9):

$$5Al_2O_3 + 4Al_2(SO_4)_3 + 27H_2O \rightarrow 6H_3O[Al_3(SO_4)_2(OH)_6]_{(s)} \quad (9)$$

In addition to aluminum sulfate, a sulfate of Na, K and/or $NH_4$ can also be used, whereby reaction (10) is obtained:

$$2Al_2O_3 + A_2SO_4 + Al_2(SO_4)_3 + 6H_2O \rightarrow 2A[Al_3(SO_4)_2(OH)_6]_{(s)} \quad (10)$$

(A = Na, K, $NH_4$)

In addition to sulfuric acid, a sulfate of Na, K and/or $NH_4$ can also be used, whereby the same precipitate is obtained as above, but in accordance with reaction (11):

$$3Al_2O_3 + A_2SO_4 + 3H_2SO_4 + 3H_2O \rightarrow 2A[Al_3(SO_4)_2(OH)_6]_{(s)} \quad (11)$$

(A = Na, K, $NH_4$)

As sulfuric acid, the alkali metal ions and ammonium ions can also be recycled.

The process according to the invention and the results obtained by it are described in greater detail in the following examples.

EXAMPLE 1

Spent sulfur-extraction catalyst from an oil refinery was subjected to an oxidizing roasting at a temperature of approx. 560° C. in order to burn the compounds of carbon and sulfur. The roasted catalyst waste was crushed and ground.

500 g of ground catalyst waste was taken and slurried in 1.5 l of water to which 458 g of sulfuric acid had been added. The mixture was placed in an autoclave and treated in it at a temperature of 200° C. for 2 hours. The total pressure was 15 bar. After the treatment the solution was separated from the solid. The solid was washed with water. The analyses of the initial material, the final solution and the final precipitate, as well as the yields of cobalt and molybdenum into the solution phase are shown in 'Experiment No. 1' row in Table 1.

EXAMPLES 2-5

The experiments of Examples 2-5 were carried out in accordance with Example 1. The conditions of the experiment and the results are in 'Experiments No. 2-5' rows in Table 1.

EXAMPLE 6

The separation of cobalt and molybdenum was carried out on solutions which had been formed in the manner of Examples 1-5 and been combined with washing waters from the washing of $H_3O$-alunite, by precipitating out the cobalt as cobalt hydroxide by means of sodium hydroxide, the molybdenum remaining as $Na_2MoO_4$ in the solution. The precipitation was carried out as a continuous operation in a two-part reactor system (RI and RII), the retention time of the solution in each being 2 h. The temperature in the reactor was between 85° and 90° C., and the NaOH concentration was 20-40 g/l. In addition, the reactors were provided with air bubbling in order to oxidize the ferrous iron present in the feed solution to ferric iron. The conditions and results of the experiment are shown in Table 2.

EXAMPLE 7

A $H_3O$-alunite based final precipitate formed in the manner of Examples 1-5 was treated thermally. The temperature was 900° C. and the treatment time was 2 h.

The analyses of the initial material and the final product were:

|  | Al % | Mo % | Co % | S % |
|---|---|---|---|---|
| Initial material | 21.5 | 0.30 | 0.04 | — |
| Final product | 46.3 | 0.65 | 0.09 | 0.48 |

EXAMPLE 8

A $H_3O$-alunite based final precipitate formed in the manner of Examples 1-5 was treated thermally. The temperature was 1200° C. and the treatment time was 2 h. The analyses of the initial material and the final product $\alpha$-$Al_2O_3$ were:

|  | Al % | Mo % | Co % | S % | V % |
|---|---|---|---|---|---|
| Initial material | 21.5 | 0.03 | 0.04 | — | — |
| Final product $\alpha$-$Al_2O_3$ | 52.0 | 0.05 | 0.1 | <0.1 | 0.003 |

EXAMPLE 9

300 g of ground catalyst waste according to Example 1 was taken and slurried in 1.5 l of water to which 280 g of sulfuric acid had been added. The mixture was placed in an autoclave and treated in it at a temperature of 200° C. for 1 hour. The total pressure was 15 bar. After the treatment the solution was separated from the solid. The solid was washed with water. The analyses of the initial material, the final solution and the final precipitate, as well as the yields of cobalt, nickel, molybdenum and vanadium into the solution phase are shown in Table 3.

The solution was treated in accordance with Example 6. The molybdenum and vanadium remained in the solution as $Na_2MoO_4$ and $Na_2VO_3$. The vanadium was precipitated out from the solution as $(NH_4)_2VO_3$. The analyses of the hydroxide precipitate and the vanadium precipitate are given in Table 4.

TABLE 1

Experiments of Examples 1-5

| Experiment No. | Initial precipitate | | | Initial solution | | Experiment conditions | | | Final solution | | | | | | Final precipitate | | | Yield | |
|---|---|---|---|---|---|---|---|---|---|---|---|---|---|---|---|---|---|---|---|
|  | Co g | Mo % | Al | V ml | H$_2$SO$_4$ g | T °C. | P bar | t h | V ml | Co | Mo | Al g/l | H$_2$SO$_4$ | SiO$_2$ | g | Co | Mo % | Al | Co % | Mo |
| 1 | 500 | 1.8 | 7.3 | 37.0 | 1500 | 458 | 200 | 15 | 2 | 1040 | 7.4 | 22.7 | 3.1 | 26.0 |  | 846 | 0.035 | 0.35 | 22.0 | 97 | 92 |
| 2 | 500 | 1.8 | 7.3 | 37.0 | 1500 | 420 | 200 | 15 | 2 | 1020 | 10.3 | 30.4 | 2.4 | pH 1.6 |  | 821 | 0.05 | 0.35 | 21.8 | 95 | 92 |
| 3 | 500 | 1.8 | 7.3 | 37.0 | 1500 | 420 | 180 | 8.5 | 2 | 1080 | 9.8 | 29.2 | 2.8 | pH 1.3 | 2.0 | 825 | 0.045 | 0.40 | 21.5 | 96 | 89 |
| 4 | 500 | 1.9 | 7.0 | 38.0 | 1500 | 445 | 220 | 23 | 2 | 1030 | 8.4 | 19.6 | 4.7 | pH 1.5 |  | 813 | 0.035 | 0.37 | 21.5 | 97 | 92 |
| 5 | 500 | 2.2 | 6.8 | 38.5 | 1500 | 458 | 200 | 15 | 2 | 1050 | 8.7 | 24.7 | 3.3 | pH 1.6 |  | 810 | 0.027 | 0.21 | 22.2 | 98 | 95 |

N.B. The washing water from the previous experiment was used in the initial solution

TABLE 2

Separation of cobalt and molybdenum by hydroxide separation from solutions formed in experiments of the type of Examples 1-5

| Sample No. | Feed into RI* | | | | | | | | RI* | | | | | | RII* | | | | | | | |
|---|---|---|---|---|---|---|---|---|---|---|---|---|---|---|---|---|---|---|---|---|---|---|
|  | Feed solution | | | | | NaOH | | Il-ma m³ h | T °C. | Solution | | | | NaOH | T °C. | Solution | | | NaOH | Precipitate | | | |
|  | ml h | Co | Mo g/l | Al | Fe | ml h | g h |  |  | Co | Mo g/l | Al | NaOH |  |  | Co | Mo g/l | Al | NaOH | Co | Mo % | Al | Fe |
| 1 | 250 | 3.2 | 13.7 | 0.51 | 1.2 | 20 | 9.4 | 5.4 | 86 | <0.01 | 14.8 | 0.02 | 35.4 | 85 | <0.01 | 14.1 | 0.51 | 35.9 | 37.3 | 0.24 | 4.7 | 12.9 |
| 2 | 290 | 5.1 | 15.0 | 0.72 | 2.1 | 20 | 9.4 | 4.7 | 89 | <0.01 | 15.9 | 0.40 | 26.0 | 89 | <0.01 | 17.5 | 0.40 | 32.0 | 36.4 | 0.25 | 3.5 | 12.9 |
| 3 | 246 | 4.3 | 14.7 | 1.5 | 1.9 | 18 | 8.3 | 6.0 | 85 | <0.01 | 15.3 | 0.8 | 23.0 | 85 | <0.01 | 16.7 | 0.7 | 25.0 | 35.1 | 0.25 | 4.3 | 14.7 |
| 4 | 232 | 3.6 | 11.5 | 0.5 | 1.5 | 22 | 9.8 | 2.2 | 87 | <0.01 | 11.8 | 0.65 | 39 | 85 | <0.01 | 12.4 | 0.7 | 38 | 28.1 | 0.57 | 6.3 | 11.9 |

TABLE 2-continued

Separation of cobalt and molybdenum by hydroxide separation from solutions formed in experiments of the type of Examples 1-5

| Sample No. | Feed into RI* Feed solution ml h | Co | Mo g/l | Al | Fe | NaOH ml h | g h | RI* II-ma m³ h | T °C | Solution Co | Mo g/l | Al | NaOH | RII* T °C | Solution Co | Mo Al g/l | NaOH | Precipitate Co | Mo Al % | Fe |
|---|---|---|---|---|---|---|---|---|---|---|---|---|---|---|---|---|---|---|---|---|
| 5 | 238 | 4.0 | 12.1 | 0.5 | 1.6 | 22 | 9.8 | 2.7 | 87 | <0.01 | 12.5 | 0.54 | 35 | 90 | <0.01 | 13.3 0.7 | 36 | 30.4 | 0.41 5.1 | 11.1 |

*RI and RII are reactors connected in series

TABLE 2

Experiment of Example 8

| Experiment No. | Initial precipitate g | Co | Ni % | Mo | V | Initial solution V ml | H₂SO₄ g | Experiment conditions T °C | P bar | t h |
|---|---|---|---|---|---|---|---|---|---|---|
| 6 | 300 | 0.6 | 1.4 | 6.5 | 4.2 | 1500 | 280 | 200 | 15 | 1 |

| Experiment No. | Final solution V ml | Co | Ni | Mo % | V | Al | pH | Final precipitate g | Co | Ni Mo % | V | Yield Co | Ni Mo % | V |
|---|---|---|---|---|---|---|---|---|---|---|---|---|---|---|
| 6 | 1040 | 1.1 | 2.6 | 11.9 | 6.9 | 1.7 | 1.4 | 465 | 0.03 | 0.03 0.25 | 0.21 | 93 | 94 97 | 86 |

TABLE 4

| | Co | Ni | Mo | V |
|---|---|---|---|---|
| Hydroxide precipitate | 14.3 | 29.6 | 0.05 | 0.5 |
| Vanadium precipitate | — | — | 0.26 | 25.8 |

What is claimed is:

1. A process for the recovery of aluminum values and value metals selected from the group consisting of cobalt, nickel, vanadium, molybdenum and mixtures thereof, from roasted crude-oil sulfurextraction catalyst wastes, comprising: leaching in an autoclave the roasted wastes in a single stage at a temperture above 100° C. with so large an amount of an aqueous leaching solution of at least one compound selected from the group consisting essentially of sulfuric acid, aluminum sulfate, alkali metal sulfate and ammonium sulfate that the value metals including aluminum substantially dissolve and aluminum is precipitated as alunite; separating the solution containing the dissolved value metals from the alunite precipitate, and recovering the value metals in the separated solution and recovering the alunite precipitate.

2. A process according to claim 1, in which the roasted wastes are treated at a temperature of 180°–220° C.

3. A process according to claim 1, in which the roasted wastes are treated with so large an amount of the aqueous leaching solution that the concentration of sulfuric acid in the solution is 2–30 g/l at the end of the leaching stage.

4. A process according to claim 1, in which the roasted wastes are treated with an amount of an aqueous solution of aluminum sulfate which is at least equivalent with regard to the reaction $5Al_2O_3 + 4Al_2(SO_4)_3 + 27H_2O \rightarrow 6H_3O[Al_3(SO_4)_2(OH)_6]$.

5. A process according to claim 1, in which the roasted wastes are treated with an amount of an aqueous solution of alkali metal sulfate or ammonium sulfate or both and sulfuric acid which is at least equivalent with regard to the reaction $3Al_2O_3 + A_2SO_4 + 3H_2SO_4 + 3H_2O \rightarrow 2A[Al_3(SO_4)_2(OH)_6]$ (A = Na, K, NH₄).

6. A process according to claim 1, in which the roasted wastes are treated with an amount of an aqueous solution of alkali metal sulfate or ammonium sulfate or both and aluminum sulfate which is at least equivalent with regard to the reaction $2Al_2O_3 + A_2SO_4 + Al_2(SO_4)_3 + 3H_2O \rightarrow 2A[Al_3(SO_4)_2(OH)_6]$ (A = Na, K, NH₄).

7. A process according to claim 1, in which the separated alunite precipitate is treated at a temperature of at least 900° C., in order to decompose it thermally.

8. A process according to claim 7, in which the separated alunite precipitate is treated at a temperature of 1150°–1250° C.

* * * * *